US011399187B2

(12) United States Patent
Zhang et al.

(10) Patent No.: US 11,399,187 B2
(45) Date of Patent: Jul. 26, 2022

(54) SCREEN CONTENT DETECTION FOR ADAPTIVE ENCODING

(71) Applicant: Intel Corporation, Santa Clara, CA (US)

(72) Inventors: Ximin Zhang, San Jose, CA (US); Sang-Hee Lee, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 389 days.

(21) Appl. No.: 15/456,194

(22) Filed: Mar. 10, 2017

(65) Prior Publication Data

US 2018/0262760 A1 Sep. 13, 2018

(51) Int. Cl.
| | |
|---|---|
| *H04N 19/103* | (2014.01) |
| *H04N 19/136* | (2014.01) |
| *H04N 19/176* | (2014.01) |
| *G06K 9/62* | (2022.01) |
| *G06V 10/36* | (2022.01) |
| *G06V 10/42* | (2022.01) |
| *G06V 10/50* | (2022.01) |
| *G06V 10/56* | (2022.01) |

(52) U.S. Cl.
CPC ......... *H04N 19/136* (2014.11); *G06K 9/6267* (2013.01); *G06V 10/42* (2022.01); *G06V 10/50* (2022.01); *G06V 10/56* (2022.01); *H04N 19/103* (2014.11); *H04N 19/176* (2014.11); *G06V 10/36* (2022.01)

(58) Field of Classification Search
CPC ...... G06K 9/52; G06K 9/6267; H04N 19/103; H04N 19/136; H04N 19/176
See application file for complete search history.

(56) References Cited

U.S. PATENT DOCUMENTS

| | | | | |
|---|---|---|---|---|
| 5,999,636 | A * | 12/1999 | Juang | B41F 33/02 |
| | | | | 250/559.05 |
| 9,870,617 | B2 * | 1/2018 | Piekniewski | G06T 7/292 |
| 2007/0280558 | A1 * | 12/2007 | Diggins | G06K 9/38 |
| | | | | 382/298 |
| 2011/0243249 | A1 * | 10/2011 | Lee | H04N 19/176 |
| | | | | 375/240.25 |
| 2011/0280494 | A1 * | 11/2011 | Da Rocha Leitao | G06T 5/002 |
| | | | | 382/274 |
| 2013/0136175 | A1 * | 5/2013 | Wang | H04N 19/176 |
| | | | | 375/240.12 |

(Continued)

*Primary Examiner* — Anner N Holder
(74) *Attorney, Agent, or Firm* — Essential Patents Group, LLP.

(57) ABSTRACT

Systems and methods for detecting screen contents and adaptive enablement of screen content coding modes. Encoding mode decision may be made adaptive to include or exclude screen content coding (SCC) modes. In some embodiments, a screen content decision is based on one or more statistics characterizing a distribution of meaningful colors (e.g., chroma) and/or intensities (e.g., luma) determined for a population of pixels of an input picture. In some embodiments, a screen content decision is based on one or more statistics characterizing the pure flat area of an input picture and the area with extreme sharp edges. Pictures may be encoded according to a mode selection that is adaptive to the screen content decision, for example selecting between encoding modes that include SCC modes, or selecting between encoding modes that exclude SCC modes.

22 Claims, 7 Drawing Sheets

(56) References Cited

U.S. PATENT DOCUMENTS

| | | | |
|---|---|---|---|
| 2013/0177206 A1* | 7/2013 | Hata | G06K 9/00624 |
| | | | 382/103 |
| 2014/0226721 A1* | 8/2014 | Joshi | H04N 19/159 |
| | | | 375/240.13 |
| 2015/0055697 A1* | 2/2015 | Wu | H04N 19/176 |
| | | | 375/240.02 |
| 2015/0215617 A1* | 7/2015 | Leontaris | H04N 19/82 |
| | | | 375/240.03 |
| 2015/0229933 A1* | 8/2015 | Guo | H04N 19/103 |
| | | | 375/240.02 |
| 2015/0264363 A1* | 9/2015 | Pu | H04N 19/186 |
| | | | 375/240.02 |
| 2016/0261870 A1* | 9/2016 | Tu | H04N 19/14 |

* cited by examiner

SCREEN CONTENT DETECTION FOR ADAPTIVE ENCODING

BACKGROUND

Visual quality is an important aspect of the user experience in many media applications. In media compression/decompression (codec) systems, visual quality may be primarily based on the compression format used. A video encoder compresses video information so that more information can be sent over a given bandwidth or stored in a given memory space, etc. The compressed signal or data may then be decoded by a decoder that decompresses the signal or data for display to a user.

Standardized codecs, such as the High Efficiency Video Coding (HEVC) standard (e.g., H.265 (12/16)), ensure that all standard compliant decoders will be able to decode standard compliant compressed video. The screen content coding (SCC) extension to HEVC has been developed by the ITU-T Video Coding Experts Group and the ISO/IEC Moving Picture Experts Group and may enable significantly improved compression performance for videos containing a substantial amount of still or moving rendered graphics, text, and animation rather than, or in addition to, natural camera-captured content. The HEVC-SCC extension includes coding tools such as intra-block copy, palette coding, adaptive color transform, and adaptive motion vector resolution, for example.

SCC profiles of the HEVC standard can be implemented by a proprietary content distribution platform (e.g., YouTube®), wireless display devices (e.g., Miracast® by Wi-Fi Alliance®, or integrated into a web-based conferencing/collaboration application (e.g., Skype®).

For the type of content that SCC targets, the coding tools may achieve a significant data rate reduction for a given quality compared to codecs lacking an SCC profile. However, for processors selecting the coding mode and performing the associated encoding tasks, significant overhead is incurred to support the additional SCC modes in addition to the more traditional encoding modes. Also, SCC coding gain on camera captured natural video is negligible and may introduce visible artifacts. Systems and techniques capable of mitigating these undesirable effects will be able to more efficiently offer the advantages of SCC, for example with lower latency, memory requirements, and/or at a lower power operating point.

BRIEF DESCRIPTION OF THE DRAWINGS

The material described herein is illustrated by way of example and not by way of limitation in the accompanying figures. Where considered appropriate, reference labels have been repeated among the figures to indicate corresponding or analogous elements. In the figures.

DETAILED DESCRIPTION

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components, it should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

Certain portions of the material disclosed herein are implemented in hardware, for example as logic circuitry in a graphics or central processor. Certain other portions may be implemented in hardware, firmware, software, or any combination thereof. At least some of the material disclosed herein may also be implemented as instructions stored on a machine-readable medium, which may be read and executed by one or more processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

Methods, devices, apparatuses, computing platforms, and articles described herein relate video coding. One or more system, apparatus, method, and computer readable media is described below for content-adaptive SCC. Adaptation of SCC extension features may be at the picture level and predicated on first detecting screen contents in a picture to be encoded. In some embodiments, screen contents detection is based on frame or picture level analysis. In other embodiments, screen contents detection is based on block-level analysis. Screen contents detection may be considered a form of picture pre-processing which generates data or metadata upon which SCC encoding tools and/or modes are enabled and/or disabled for encoding of the picture. By disabling SCC modes based on the pre-processing data, overhead associated at least with the encoding mode decisions may be reduced where the pre-processing data indicates it is unlikely that SCC modes would be beneficial and/or selected for encoding the picture. By enabling SCC modes based on the picture pre-processing data, overhead associated at least with the encoding mode decisions may be incurred only where the pre-processing data indicates it is likely that the SCC modes would be beneficial and/or selected for encoding the picture.

According to embodiments herein, an encoder may be made adaptive to screen content detection of a video frame and may operating in a first state (e.g., SCC enabled) to encode the corresponding frame into a bitstream, and then operate in a second state (e.g., SCC disabled) to encode a subsequent frame into the bitstream. A decoder may then decompress/decode the bitstream to reproduce frames for presentation/display to an end user following any known decoding technique(s) compatible with the SCC extension.

Figure 1:
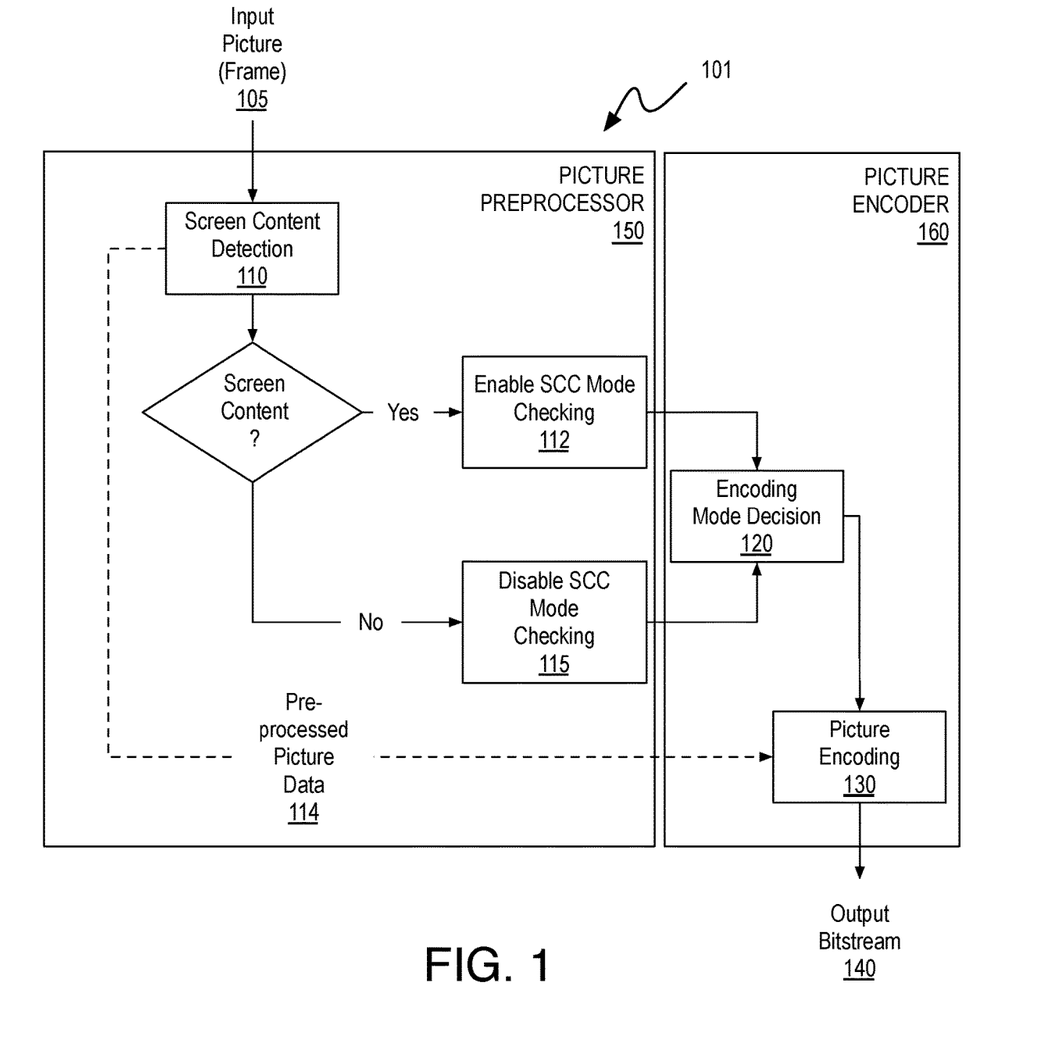
FIG. 1 is a schematic of an adaptive coding architecture operable for screen content detection and adaptive video encoding, in accordance with some embodiments.

FIG. 1 is a schematic of an adaptive coding architecture 101 operable for screen content detection and adaptive video encoding, in accordance with some embodiments. In exemplary embodiments, architecture 101 is implemented b a codec that is compatible with one or more standards, such as the HEVC H.265(12/16) standard. Architecture 101 takes as an input 105 a picture or frame and outputs a compressed bitstream 140. An input picture comprises picture elements, or pixels. The input picture may have any spatial (display) resolution (height and width pixel count), such as, but not limited to high-definition (e.g., HD or 1280×720, 4 KUHD or 3840×2160, 8 K UHD) or 7680×4320), video graphics array (e.g., SD or 640×480), extended graphics array (e.g., WXGA or 1366×768), etc. An input video may comprise consecutive ones (e.g., N, N+1, N+2, etc.) of such frames or pictures. Compressed bitstream 140 may comport with any standard format, for example one that can be decoded by an HEVC hypothetical reference decoder (HRD) including a decoder buffer, decoder and display.

Adaptive coding architecture 101 includes a picture preprocessor 150 and picture encoder 160. Picture preprocessor 150 and picture encoder 160 may each be implemented purely in hardware, for example with fixed function circuitry embedded in application specific integrated circuit (ASIC). Picture preprocessor 150 and picture encoder 160 may also be implemented with firmware, for example with any combination of fixed function circuitry, and/or programmable registers, and/or logic gates. Picture preprocessor 150 and picture encoder 160 may also be implemented with fully programmable circuitry, for example with programmable processor circuitry having a given instruction set architecture executing commands defined through software. Hardware, firmware, or software implementations picture preprocessor 150 may be implemented with hardware, firmware, or software implementations of picture encoder 160.

As further shown in FIG. 1, picture preprocessor 150 is communicatively coupled to receive a video frame or picture from input 105 and performs screen content detection 110 where each received input picture is analyzed and determined to either qualify as screen content, or not. In some embodiments, as described further herein, screen content detection 110 is predicated on one or more picture statistics. These picture statistics may, for example, be indicative of a distribution of pixel values determined for one or more population of pixels in the input picture. The pixel values may be pixel intensity (e.g., luma) and/or pixel color (e.g., chroma), for example. In some embodiments of content detection 110 described further below, statistical descriptors of an input picture are computed at the picture level. In other words, pixels in a picture are treated as one population described by one or more statistical parameters or descriptors, which are then compared against one or more corresponding pre-determined thresholds. In some other embodiments of content detection 110 described further below, statistical descriptors of an input picture are computed at a sub picture, or block, level. For example, pixels within a given block are treated as a population and one or more statistical parameters or descriptors are determined for the block. A plurality of such statistics one statistic for each block of the picture) is then compared against one or more pre-determined thresholds.

In architecture 101, when an input picture is detected to be screen content (e.g., one or more threshold is satisfied), an SCC mode check is enabled at operation 112. The SCC mode check may be a flag, or status bit, or any register value(s) employed to indicate SCC coding modes are enabled for encoding the input picture. If the SCC mode check is enabled, SCC coding modes and/or tools are a possibility and an encoding mode decision 120 is made by selecting from a first set of encoding modes or profiles that includes one or more SCC modes. During mode decision 120, the various modes included in the first set of modes are evaluated and most suitable mode selected according to any mode selection logic. If instead, the SCC mode check is disabled at operation 115, SCC coding modes and/or tools are not available for encoding blocks of the input picture and coding modes for the blocks are selected at mode decision 120 from a second set of modes or profiles that excludes SCC modes. Picture encoding 130 is then performed by encoder 160 to generate output bitstream 140 using the coding modes identified for corresponding picture blocks at mode decision 120. Any known picture encoder algorithms, techniques, and systems may be employed during picture encoding 130. Successive input pictures may be similarly processed through picture preprocessor 150 and picture encoder 160.

With the encoding mode selection predicated on screen content detection, encoding mode decision 120 may be simplified adaptively. Mode decision errors may also be reduced along with a concomitant reduction in compression artifacts, and or encoding efficiency losses associated with the use of a non-optimal encoding mode at picture encoding 130. Architecture 101 may therefore achieve all the quality gain possible through SCC modes for those pictures including screen content while implementing an encoder of lower complexity and lower memory requirements for camera-captured natural video pictures.

Notably, picture preprocessing performed to detect screen contents in accordance with some further embodiments may also be employed as an input or hint in other decisions performed during picture encoding 130. As denoted by dashed line in architecture 101, pre-processed picture data 114 may be optionally input into one or more control points within picture encoding 130. For example, a transform unit (TU) depth decision may be predicated, at least in part, on pre-processed picture data 114. More specifically, TU depth options may be varied (e.g. skewed) as a function of the screen content decision and/or the picture data 114 upon which the screen content decision was also based. In some embodiments, transform units for encoding a picture may be selected from a first set of TU sizes including two or more TU sizes when the frame is classified as non-screen content, and selected from a second set of TU sizes when the frame is classified as screen content. The second set of TU sizes, may for example, exclude at least the largest one of the TU sizes included in the first set. The second set of TU sizes, may for example, include at least one TU size that is smaller than those included in the first set. For example, where TU size is selected from a first set of TU sizes including 8×8 and 16×16 when a picture is non-screen content, TU size may be selected from a second set of TU sizes excluding 16×16 and/or including 4×4 when a picture is deemed screen content.

Figure 2:
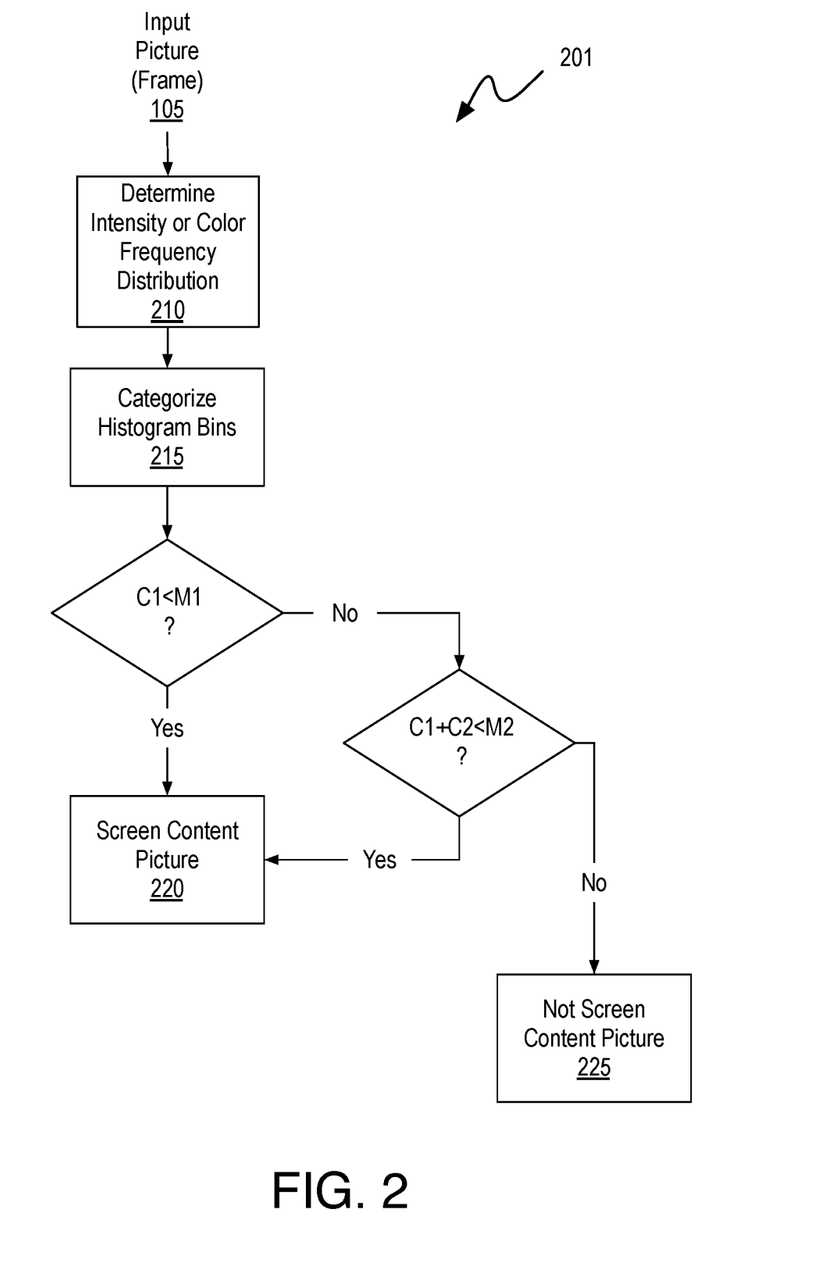
FIG. 2 is a flow diagram illustrating methods of screen content detection, in accordance with some embodiments.

In some embodiments, a screen content decision is based on one or more statistics characterizing a distribution of meaningful colors (e.g., chroma) and/or intensities (e.g., luma) determined for a population of pixels of an input picture. FIG. 2 is a flow diagram illustrating methods 201 for detecting screen content, in accordance with some such embodiments. Methods 201 may be performed, for example, as part of screen detection 110 (FIG. 1), and pre-processed picture data 114 may include the statistics generated by methods 201. A computer processor including suitable fixed-function circuitry and/or programmable circuitry, may implement methods 201, for example. As shown in FIG. 2, methods 201 begin within receiving an input picture or frame at input 105. At operation 210, the frequency of a pixel value for all pixel values spanning the range of possible values within the picture is determined. In some embodiments, the pixel value is one-dimensional (e.g., luma). For such embodiments, the frequency or count of pixels having a particular value may be determined for the picture and over the range of pixel values. For example, a pixel value that may span the range of 0-255, a count of pixel values equal to 0, a count of pixel values equal to 1, and a count of pixel values equal to 2, etc. all the way to 255 may be computed at operation 210. In other embodiments, the pixel value is multi-dimensional, for example including both luma and chroma components. For such embodiments, the frequency or count of pixels having a particular ordered triple may be determined for the picture and over the range of all possible triplets. For example, a YUV ordered triplet, a YCbCr ordered triplet, or the like, may be determined as a count of pixels having the values (0, 0, 0), a count of pixels having the values (0, 0, 1), a count of pixels having the values (0, 0, 2), etc., through (255, 255, 255).

Figure 3:
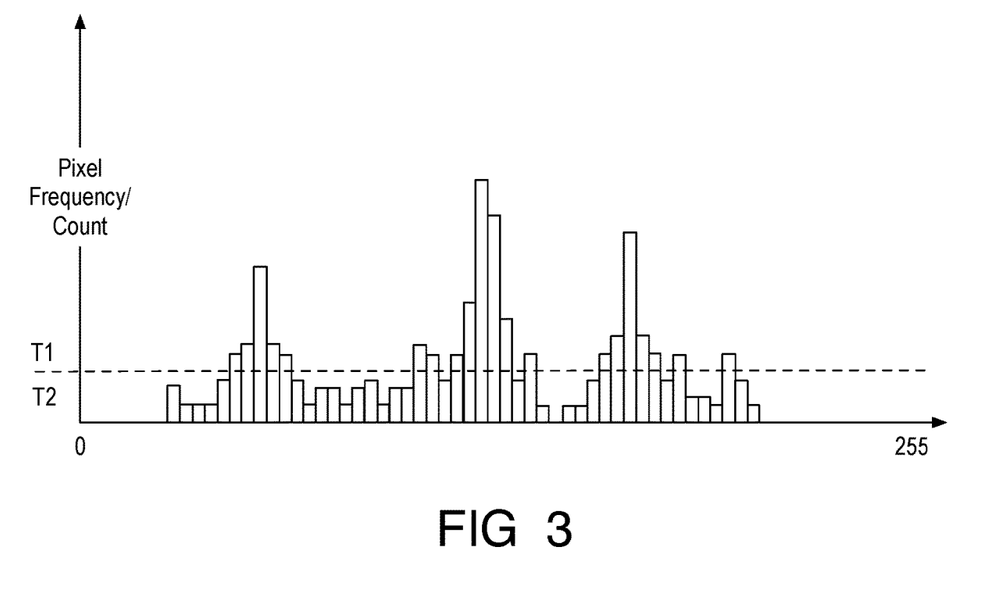
FIG. 3 is a histogram illustrating pixel intensity frequency determined for a picture, in accordance with some embodiments.

FIG. 3 is a histogram illustrating pixel luminance intensity frequencies determined at operation 210 for an exemplary picture, in accordance with some embodiments. Notably, the depicted histogram is merely for illustrating the statistic computation. In FIG. 3, luminance values over the range of 0-255 are illustrated with a bin size of 1 so that pixels of the same luminance intensity contribute to the frequency, count, or number of pixels having one of 256 unique luminance values.

Returning to FIG. 2, methods 201 continue at operation 215 where the pixel value frequencies are categorized into two or more categories. The categorization is advantageously based on a magnitude of the pixel value frequency with those values of a frequency satisfying a first predetermined threshold being grouped together into a first category, and those having a frequency insufficient to be in the first category then being grouped together into a second category. Depending on the threshold value chosen, satisfaction of the first threshold may be in terms of meeting or exceeding a minimum pixel value frequency/count threshold. In some embodiments, the second category may also be bracketed to include only those pixel values having a frequency satisfying a third predetermined threshold that is somewhat less than the second predetermined threshold, but also non-zero. Pixel values then having a frequency insufficient to be in the second category may then be grouped together into a third category.

FIG. 3 further illustrates the application of a first frequency/count threshold $T_1$ and a second frequency/count threshold $T_2$, each associated with a dotted line. The number of all pixel values having a count (y-axis value) exceeding $T_1$ is determined as the first category bin count $C_1$. In the example of FIG. 3, twenty luminance intensity values (bins) satisfy threshold $T_1$ and therefore the first category bin count $C_1$ determined at operation 215 for this exemplary picture is 20. In the example of FIG. 3, twenty-six luminance intensity values (bins) failing to satisfy threshold $T_1$ satisfy threshold $T_2$ and therefore the second category bin count $C_2$ determined at operation 215 for this exemplary picture is 26.

In methods 201 (FIG. 2), the first category bin count $C_1$, or any equivalent statistic that is also indicative of the number of pixel value frequencies that exceed (or meet) a highest frequency threshold, is then tested against a first category bin count threshold $M_1$. When the first category bin count $C_1$ is less than a category bin count threshold $M_1$, methods 201 end at operation 220 where the picture is deemed screen content. For the example shown in FIG. 3, methods 201 would end at operation 220 for embodiments where $M_1$ is larger than 20. Screen content may be expected to have relatively few luminance values that at least some minimum number of pixels have in common. Screen content may, for example, have pixel values with significantly less noise than a camera captured picture, with a given luminance intensity value assigned to a relatively large number of pixels, and each of those pixels being precisely their assigned luminance intensity. Hence, relatively large counts of relatively few different pixel luminance intensity values may be expected for certain screen content frames, and may be detected at operation 220 upon proper timing of thresholds $T_1$ and $M_1$.

As further shown in FIG. 2, if the first category bin count $C_1$ is not less than the first category bin count threshold $M_1$ (e.g., $M_1$ is not larger than 20 for the example shown in FIG. 3), methods 201 continue by testing the first category bin count $C_1$ summed with the second category bin count $C_2$ against a category bin count threshold $M_2$. Methods 201 again end at operation 220 where the picture is deemed screen content if the first and second category bin sum $C_1+C_2$ is less than category bin count threshold $M_2$. If instead the first and second category bin sum $C_1+C_2$ meets or exceeds category bin count threshold $M_2$, methods 201 end at operation 225 where the picture is deemed non-screen content. For the example shown in FIG. 3 where the first and second category bin sum $C_1+C_2$ is 46, methods 201 would end at operation 220 if $M_2$ is more than 46 and would end at operation 225 if $M_2$ is not more than 46. Use of the first and second category bin sum allows for further independent tuning of thresholds $T_2$ and $M_2$ as a second chance to detect relatively large counts of relatively few different pixel luminance intensity values, which may be expected for a screen content picture.

Figure 4:
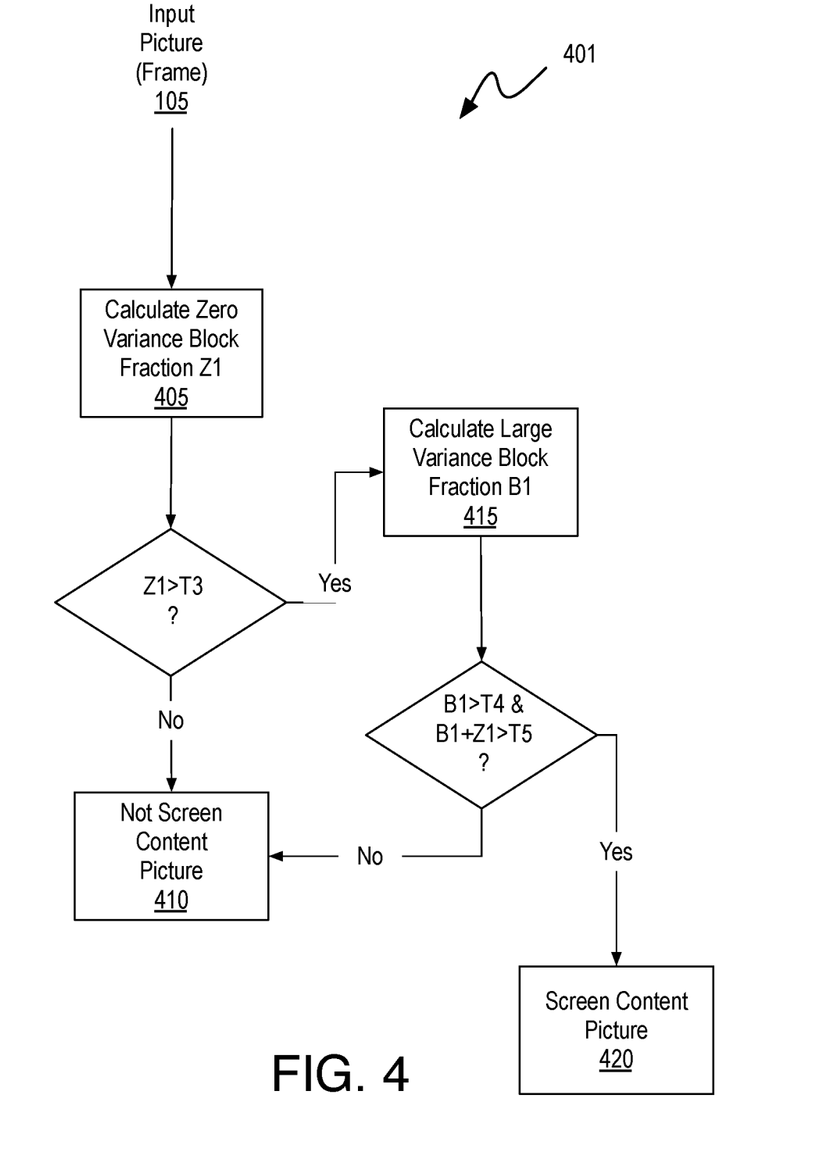
FIG. 4 is a flow diagram illustrating methods of screen content detection, in accordance with some alternative embodiments.

In some embodiments, a screen content decision is based on one or more statistics characterizing the pure flat area of an input picture and the area with extreme sharp edges. FIG. 4, is a flow diagram illustrating methods 401 for screen content detection, in accordance with some such embodiments. Methods 401 may be performed, for example, as part of screen detection 110 (FIG. 1), and pre-processed picture data 114 may include one or more statistics generated by methods 401. A computer processor including suitable fixed-function circuitry and/or programmable circuitry may implement methods 401, for example. As shown in FIG. 4, methods 401 again begin within receiving an input picture or frame at input 105. The picture is divided into a number of blocks. Each of the blocks is advantageously the same size, having the same number of pixels, but the block size may vary with implementation. Exemplary block sizes range from 4×4 pixels to 16×16 pixels (e.g., 8×8), but may be larger.

For each of the sub-picture blocks, variance in the pixel value is computed. In some embodiments, the pixel value is one-dimensional (e.g., luma) and may span the range of 0-255. For such embodiments, the variance (e.g., in the luma value) is determined for each block, block by block. Alternatively, another statistic indicative of the variance may be determined for each block. In other embodiments where the pixel value is multi-dimensional, for example including luma and chrominance components, a covariance matrix is computed. For example, a covariance matrix of YUV ordered triplets, YCbCr ordered triplets, or the like, for each block may be determined.

With the block variance (or comparable statistic) of all blocks determined, methods 401 continue at operation 405 where the proportion of all blocks in the picture satisfying a minimal variance threshold is determined. This proportion may be expressed as a first ratio $Z_1$ of blocks in the picture satisfying a minimal variance threshold over the number of blocks in the picture. Proportion $Z_1$ may be expressed as a fraction, as a percentage, or the like. In some exemplary embodiments, the minimal variance threshold is zero with $Z_1$ then representing the proportion (e.g., percentage) of zero variance blocks within the input picture. $Z_1$ may therefore serve as a statistic indicative of flatness area within the input picture.

Methods 401 continue with a comparison of the proportion of the blocks satisfying the minimal variance threshold against a first proportion threshold $T_3$. When the proportion of the blocks satisfying the minimal variance threshold is insufficient, methods 401 end at operation 410 where the input picture is deemed non-screen content. For example, when the proportion of the blocks satisfying the minimal variance threshold is less than first proportion threshold $T_3$, the input picture is deemed non-screen content. Hence, where the statistic indicates flatness area is insufficient, the picture is determined to be non-screen content.

When the proportion of the blocks satisfying the minimal variance threshold is sufficient, methods 401 continue at operation 415, where the proportion of all blocks in the picture satisfying a large variance threshold is determined. This proportion may be expressed as a second ratio $B_1$ (e.g., fraction, percentage, etc.). Proportion $B_1$ may be expressed as a fraction, as a percentage, or the like. In some exemplary embodiments, the large variance threshold is greater than the minimal variance threshold and is non-zero. Proportion $B_1$ then represents the proportion of large variance blocks within the input picture. Proportion $B_1$ may therefore serve as a statistic indicative of extreme sharp edge area within the input picture.

Methods 401 continue with testing the proportion of the blocks satisfying the larger variance threshold against a second proportion threshold $T_4$. The proportion of the blocks satisfying the minimal variance threshold summed with the proportion of the hocks satisfying the larger variance threshold is further compared against a cumulative proportion threshold $T_5$. When either the proportion of the blocks satisfying the larger variance threshold is insufficient, or the summed proportions of the blocks is insufficient, methods 401 again end at operation 410 where the input picture is deemed non-screen content. For example, when the proportion of the blocks satisfying the large variance threshold is not greater than proportion threshold $T_4$, or the proportion of blocks satisfying the minimal variance threshold summed with the proportion of blocks satisfying the large variance threshold is not greater cumulative proportion threshold $T_5$, the input picture is deemed non-screen content. When both the proportion of the blocks satisfying the larger variance threshold is sufficient, and the summed proportions of the blocks is sufficient, methods 401 end at operation 420 where the input picture is deemed to be screen content. Hence, where there is both relatively large flatness area and relatively large extreme edge area, screen content may be detected at operation 420 upon proper tuning of thresholds $T_3$, $T_4$ and $T_5$. Although tuning of thresholds $T_3$-$T_5$ is left to those of ordinary skill in the art as a matter for routine experimentation, one or more of $T_3$-$T_5$ may be around 10-20%, or less, of the picture blocks.

Methods 201 and 401 are each examples of screen content detection methods that may each be employed independently of the other in an adaptive encoding architecture such as architecture 101. However, combinations of methods 201 and 401 are also possible. For example, in some embodiments screen content detection may be predicated on both methods 201 and 401 agreeing that a picture is screen content. Then, upon disagreement between methods 201 and 401, a picture may be deemed non screen content and SCC modes disabled. As another exemplary combination of methods 201 and 401, screen content detection may be predicated on at least one of methods 201 and 401 deeming a picture to be screen content. Then, SCC modes may be disabled only upon both methods 201 and 401 agreeing that a picture is non-screen content.

Figure 5:
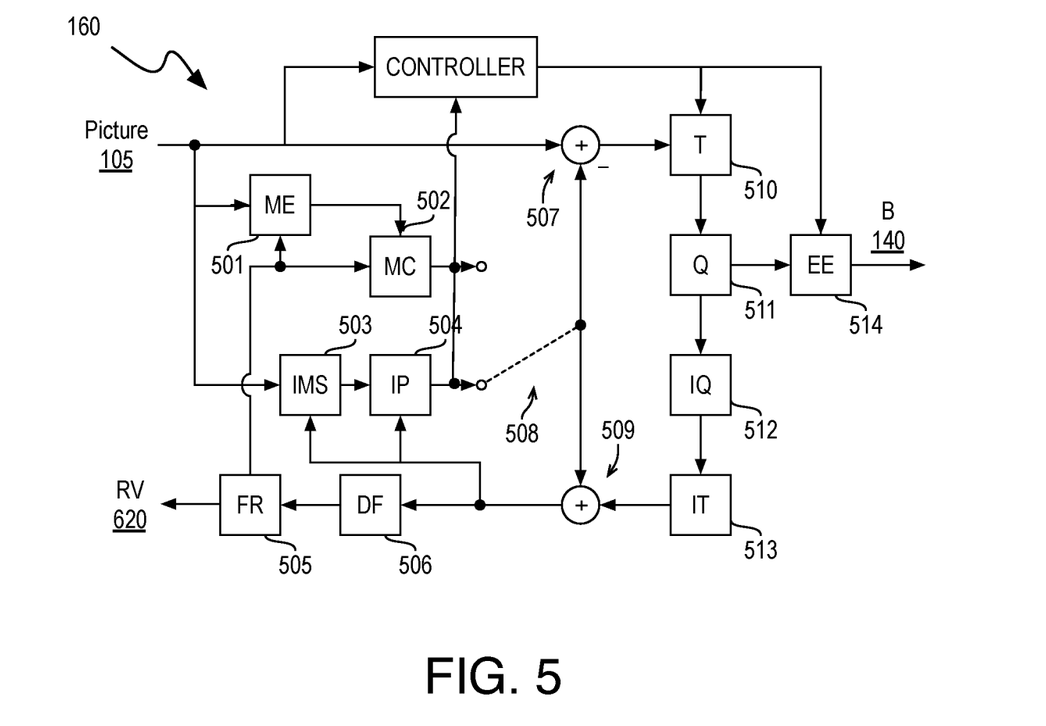
FIG. 5 is a block diagram illustrating an adaptive video encoder, in accordance with some embodiments.

FIG. 5 is a block diagram illustrating adaptive picture encoder 160, in accordance with some embodiments. Encoder as shown, encoder 160 includes a motion estimator (ME) 501, a motion compensator (MC) 502, an intra mode selector (IMS) 503, an intra prediction (IP) module 504, a frame reconstruction (FR) module 505, a deblock filter (DF) 506, a differencer 507, a selector 508, an adder 509, a transform (T) module 510, a quantizer (Q) 511, an inverse quantizer (IQ) 512, an inverse transform (IT) module 513, and an entropy encoder (EE) 514. Encoder 160 may include additional functional logic blocks that are not shown for the sake of clarity.

During operation, encoder 160 receives input frames or pictures and may output a resulting compressed data bitstream (B) 140. For example, encoder 160 may divide an input frame or picture into blocks of one or more sizes, which may be either temporally predicted (inter-prediction) via motion estimator 501 and motion compensator 502, or spatially predicted. (intra-prediction) as a function of the state of ultra mode selector 503. Coding decisions between inter mode(s) and intra mode(s) may be implemented via mode selector 508. Based on the intra-coding or inter-coding, a difference between source pixels and predicted pixels may be determined by differencer 507. The difference may be converted to the frequency domain (e.g., based on a discrete cosine transform) by transform module 510, which is then converted to quantized coefficients by quantizer 511. Such quantized coefficients along with various control signals may be entropy encoded by entropy encoder 514 to generate encoded bitstream 140, which may be transmitted or transferred to a decoder.

Quantized coefficients may be inverse quantized via inverse quantizer 512 and inverse transformed by inverse transform module 513 to generate reconstructed differences or residuals. The reconstructed differences or residuals may be combined with reference blocks via adder 509 to generate reconstructed blocks, which, as shown, may be provided to intra mode selector 503 and intra prediction module 504 for use in intra prediction. Furthermore, the reconstructed differences or residuals may be deblocked via deblock filter 506 and reconstructed via frame reconstruction module 505 to generate reconstructed pictures, which may be stored in a picture buffer (not shown) and provided to motion estimator 501 and motion compensator 502 for use in inter prediction. Reconstructed frames may be provided as reconstructed video (RV) 520 for use in temporal filtering, etc. For example, RV 520 may be generated by a local decode loop of encoder 160. The local decode loop may include inverse quantizer 512, inverse transform module 513, adder 509, deblock filter 506, motion compensator 502, and intra prediction module 504.

Figure 6A:
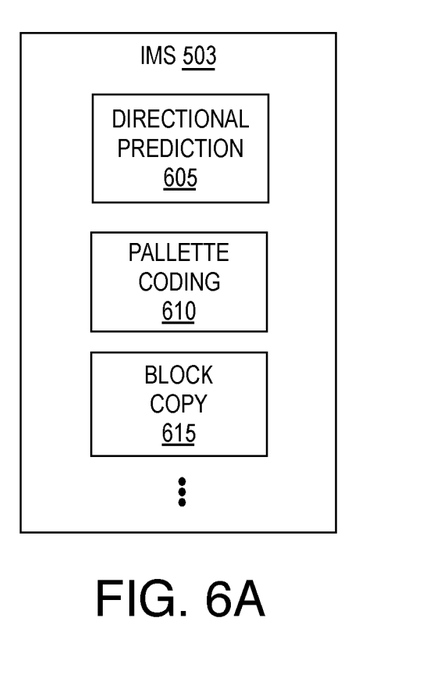
FIGS. 6A and 6B are block diagrams illustrating adaptive states of an intra mode selector, in accordance with some embodiments.
Figure 6B:
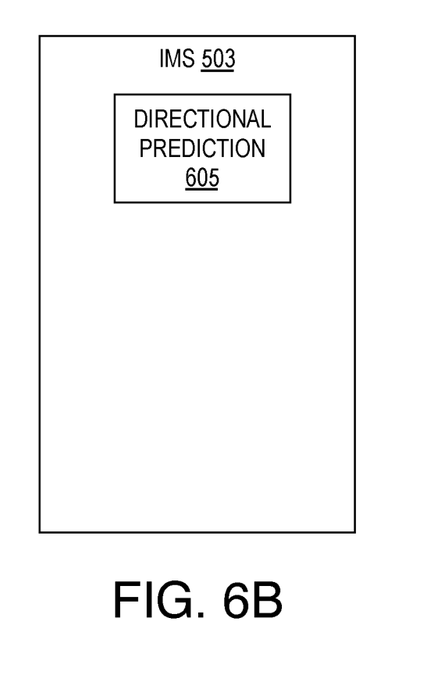

In some embodiments, one or more of the components in encoder 160 adapt in response to screen content detection, for example in accordance with any of the detection methods described above. In some exemplary embodiments, at least intra mode selector 503 is adaptive to screen content detection. An adaptive mode decision may also be implemented so that a decision between inter-prediction and intra-prediction modes is adaptive to screen content detection. For example, in FIG. 5, mode selector 508 may select between inter-prediction and intra-predication modes that include one or more SCC modes if screen content is detected, and exclude the one or more SCC modes if screen content is not detected. For such embodiments, mode selector 508 may select from many encoding modes (e.g., 5-20, or more) with the available modes condiment on screen content detection. FIGS. 6A and 6B are block diagrams illustrating adaptive states for intra mode selection, in accordance with some embodiments of intra mode selector 503. In response to a picture being deemed screen contents, intra mode selector 503 is operative in a first state illustrated in FIG. 6A. In this first state, intra mode selector 503 is operable to select between a set of intra-prediction coding modes including one or more directional prediction modes 605 and one or more SCC coding modes including at least one of palette coding mode 610 and block copy mode 615. Other SCC modes, such as adaptive color transform, and adaptive motion vector resolution may also be included in the first set of modes.

In response to a picture being deemed non-screen contents, intra mode selector 503 is operative in a second state illustrated in FIG. 6B, in this second state, intra mode selector 503 is operable to select between a set of intra-prediction coding modes including one or more directional prediction modes 605, but excluding the one or more SCC coding modes available in the first state. For example, neither palette coding mode 610 nor block copy mode 615 is available in the second operative state of intra mode selector 503.

Programmable processors, such as a central processor or graphics processor may execute the operations as described herein. Such operations may be implemented via software or hardware or a combination thereof. In an embodiment, the illustrated modules of encoder 160 may be implemented with logic circuitry. For example, a computer processor may include circuitry dedicated to manipulate input video data to generate compressed video data bitstream. Such a computer processor may include any number and type of processing units or modules that may provide control and other high level functions for encoder 160. Such a processor may be coupled to, or included embedded within the processor, any type of electronic memory such as volatile memory (e.g., Static Random Access Memory (SRAM), Dynamic Random Access Memory (DRAM), etc.) or non-volatile memory (e.g., flash memory, etc.), and so forth. In some embodiments, the memory is configured to store pre-processor video data such as picture-level and/or block level pixel value statistics, for example as discussed elsewhere herein. In a non-limiting example, the electronic memory is implemented by cache memory of the computer processor implementing encoder 160. In some embodiments transform, quantization and entropy encoding modules of encoder 160 are implemented by execution units (EU) of a graphics processor. Each EU may include, for example, programmable logic or circuitry that may provide a wide array of programmable logic functions. In some embodiments, transform, quantization and entropy encoding modules of encoder 160 are implemented with dedicated hardware such as fixed function circuitry. Fixed function circuitry may provide a set of fixed function entry points that may map to dedicated logic for a fixed purpose or function.

Various components of encoder 160 may be implemented in software, firmware, and/or hardware and/or any combination thereof. Various components of encoder 160 may be provided, at least in part, by hardware of a computing System-on-a-Chip (SoC) such as may be found in a computing system such as, for example, a smart phone or other mobile computing device. Those skilled in the art may recognize that systems described herein may include additional components that have not been depicted in the corresponding figures.

While implementation of the exemplary methods discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of encoder 160, or any component or module thereof, for example as discussed elsewhere herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part off larger system, for example, an integrated circuit (IC), system on-chip (SoC), and so forth.

Figure 7:
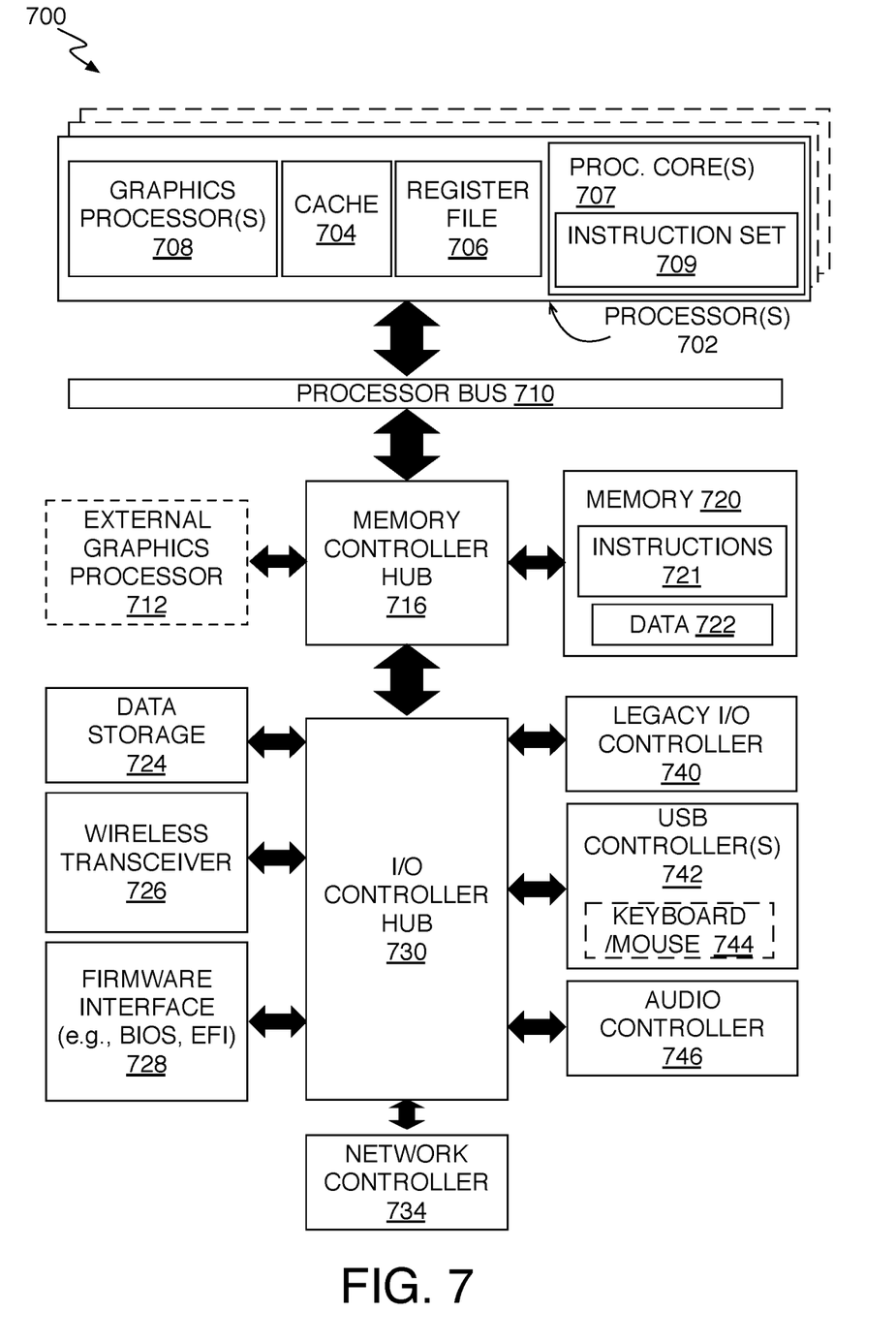
FIG. 7 is a block diagram of a data processing system, according to some embodiments.

FIG. 7 is a block diagram of a data processing system 700, according to some embodiments. Data processing system 700 includes one or more processors 702 and one or more graphics processors 708, and may be a single processor desktop system, a multiprocessor system, or a server system having a large number of processors 702 or processor cores 707. In on embodiment, the data processing system 700 is a system-on-a-chip (SoC) integrated circuit for use in mobile, handheld, or embedded devices.

An embodiment of data processing system 700 can include, or be incorporated within a server-based gaming platform, a game console, including a game and media console, a mobile gaming console, a handheld game console, or an online game console. In some embodiments, data processing system 700 is a mobile phone, smart phone, tablet computing device or mobile Internet device. Data processing system 700 can also include, be couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW), Multiple processor cores 707 may each process a different instruction set 709, which may include instructions to facilitate the emulation of other instruction sets. A processor core 707 may also include other processing devices, such a Digital Signal Processor (DSP).

In some embodiments, the processors 702 include cache memory 704. Depending on the architecture, the processors 702 can have a single internal cache or multiple levels of internal cache. In some embodiments, the cache memory is shared among various components of the processors 702. In some embodiments the processors 702 also uses an external cache (e.g., a Level-3 (L3) cache or Last Level Cache (LLC)) (not shown), which may be shared among processor cores 707 using known cache coherency techniques. A register file 706 is additionally included in processors 702 which may include different types of registers for storing different types of data (e.g., integer registers, floating point registers, status registers, and an instruction pointer register). Some registers may be general-purpose registers, while other registers may be specific to the design of the processors 702.

In some embodiments, processors 702 are coupled to a processor bus 710 to transmit data signals between processors 702 and other components in system 700. System 700 uses an exemplary 'hub' system architecture, including a memory controller hub 716 and an input output (I/O) controller hub 730. Memory controller hub 716 facilitates communication between a memory device and other components of system 700, while I/O Controller Hub (ICH) 730 provides connections to devices via a local bus.

Memory device 720 can be a dynamic random access memory (DRAM) device, a static random access memory (SRAM) device, flash memory device, or some other memory device having suitable performance to serve as process memory. Memory 720 can store data 722 and instructions 721 for use when processors 702 executes a process, such as any of the picture pre-processing methods, screen content detection methods, or encoding methods described herein. Memory controller hub 716 also couples with an optional external graphics processor 712, which may communicate with the one or more graphics processors 708 in processors 702 to perform graphics and media operations.

In some embodiments, ICH 730 enables peripherals to connect to memory 720 and processors 702 via a high-speed I/O bus. The I/O peripherals include an audio controller 746, a firmware interface 728, a wireless transceiver 726 (e.g., Wi-Fi, Bluetooth), a data storage device 724 (e.g., hard disk drive, flash memory, etc.), and a legacy I/O controller for coupling legacy (e.g., Personal System 2 (PS/2)) devices to the system. One or more Universal Serial Bus (USB) controllers 742 connect input devices, such as keyboard and mouse 744 combinations. A network controller 734 may also couple to ICH 730. In some embodiments, a high-performance network controller (not shown) couples to processor bus 710.

Figure 8:
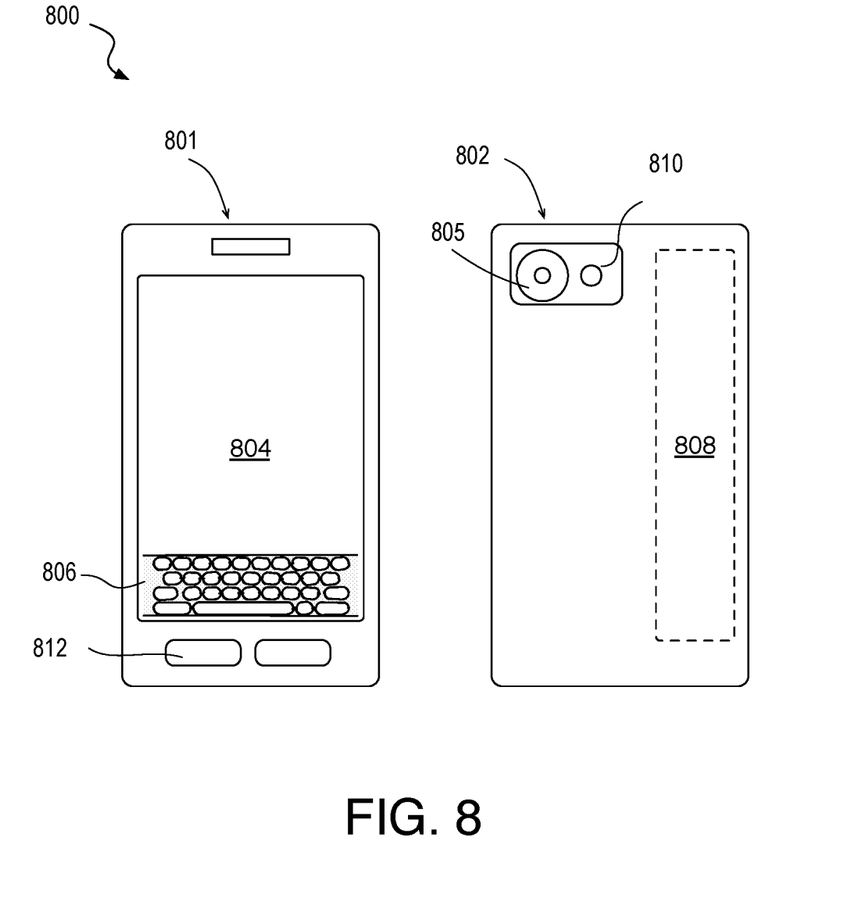
FIG. 8 is a diagram of an exemplary mobile device, arranged in accordance with some embodiments.

As shown in FIG. 8, mobile device 800 may include a housing 802, a display 804, an input/output (I/O) device 806, and an antenna 808. Device 800 also may include navigation features 812. Display 804 may include any suitable display unit for displaying information appropriate for a mobile computing device. I/O device 806 may include any suitable 110 device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 900 by way of microphone (not shown), or may be digitized by a voice recognition device. Embodiments are not limited in this context. In some embodiments, device 800 further includes data processing system 700.

Embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed may then be understood to have been physically transformed into a system falling within the scope of the embodiments described herein, instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

In one or more first embodiments, an apparatus for video encoding, the apparatus comprising one or more processors to determine one or more statistics indicative of pixel value distribution within a picture, classify the picture as screen content or non-screen content based on a comparison of the statistics to one or more predetermined thresholds, select coding modes for blocks of the picture from a first set of coding modes including one or more screen content coding modes when the picture is classified as screen content, and from a second set of modes excluding the screen content coding modes when the picture is classified as non-screen content, and generate a bitstream by encoding the blocks of the picture according to their selected coding modes.

In one or more second embodiments, for any of the first embodiments the statistics comprise a frequency of a pixel value within the picture, and the processors are to determine the frequency for each of a plurality of pixel values spanning a range of possible pixel values, or the statistics comprise variance of the pixel value within a block of the picture, and the processors are to determine the variance for each of the blocks within the picture.

In one or more third embodiments, for any of first or second embodiments the pixel value comprises luma.

In one or more fourth embodiments, for any of first, second or third embodiments the pixel value further comprises chrominance.

In one or more fifth embodiments for any of the first through fourth embodiments the processors are to determine a first statistic indicative of the number of the pixel value frequencies that exceed a first frequency threshold, and classify the picture as screen content in response to the first statistic being less than a first category bin count threshold.

In one or more sixth embodiments for any of the fifth embodiments the processors are to determine a second statistic indicative of a number of the pixel value frequencies that fail to exceed the first frequency threshold, but exceed a second frequency threshold smaller than the first frequency threshold, and classify the picture as screen content in response to a sum of the first and second statistics being less than a cumulative category bin count threshold.

In one or more seventh embodiments for any of the sixth embodiments the processors are to classify the picture as screen content in response to the sum of the first and second statistics being less the cumulative category bin count threshold when the first statistic exceeds the first category bin count threshold, and classify the picture as non-screen content when the sum of the first and second statistics also exceeds the cumulative category bin count threshold.

In one or more eighth embodiments, for any of the first or second embodiments the processors are to determine a first statistic indicative of a proportion of the blocks satisfying a minimal variance threshold, and classify the picture as non-screen content in response to the first statistic failing to satisfy a first proportion threshold.

In one or more ninth embodiments, for any of the eighth embodiments the minimal variance threshold is equal to zero and the first statistic is the proportion of the blocks having zero variance.

In one or more tenth embodiments, for any of the ninth embodiments the processors are to determine a first statistic indicative of the proportion of the blocks satisfying a minimal variance threshold, determine a second statistic indicative of the proportion of the blocks satisfying a large variance threshold. The processors are to classify the picture as screen content in response to the second statistic satisfying a second proportion threshold, and the proportion of blocks satisfying the minimal variance threshold, when summed with the proportion of blocks satisfying the large variance threshold, satisfying a cumulative proportion threshold.

In one or more eleventh embodiments the processors are to classify the picture as screen content in response to the first statistic failing to be less than the first proportion threshold, the second statistic exceeding the second proportion threshold, and the summation of the first and second statistics exceeding the cumulative proportion threshold. The processors are to classify the picture as non-screen content in response to the first statistic being less than the first proportion threshold, or the second statistic failing to exceed the second proportion threshold, or the proportion of blocks satisfying the large variance threshold failing to exceed the total proportion threshold.

In one or more twelfth embodiments, for any of the first through eleventh embodiments the processors are to select transform units (TU) for the picture from a first set of TU sizes including two or more TU sizes when the picture is classified as non-screen content, and from a second set of TU sizes including at least one TU size smaller than those included in the first set when the picture is classified as screen content.

In one or more thirteenth embodiments, a computer-implemented method for video encoding comprises determining one or more statistics indicative of pixel value distribution within a picture, classifying the picture as screen content or non-screen content based on a comparison of the statistics to one or more predetermined thresholds, selecting coding modes for blocks of the picture from a first set of coding modes including one or more screen content coding modes when the picture is classified as screen content, and from a second set of modes excluding the screen content coding modes when the picture is classified as non-screen content, and generating a bitstream by encoding the blocks of the picture according to their selected coding modes.

In one or more fourteenth embodiments, for any of the thirteenth embodiments the statistics comprise a frequency of a pixel value within the picture, and determining the statistics further comprises determining the frequency for each of a plurality of pixel values spanning a range of possible pixel values, or the statistics comprise variance of the pixel value within a block of the picture, and determining the statistics further comprises determining the variance for each of the blocks within the picture.

In one or more fifteenth embodiments, for any of the thirteenth or fourteenth embodiments the pixel value comprises luma.

In one or more sixteenth embodiments for any of the fourteenth embodiments determining the statistics further comprises determining a first statistic indicative of the number of the pixel value frequencies that exceed a first frequency threshold, and classifying the picture further comprises classifying the picture as screen content in response to the first statistic being less than a first category bin count threshold.

In one or more seventeenth embodiments, for any of the sixteenth embodiments determining the statistics further comprises determining a second statistic indicative of a number of the pixel value frequencies that fail to exceed the first frequency threshold, but exceed a second frequency threshold smaller than the first frequency threshold, and classifying the picture further comprises classifying the picture as screen content in response to a sum of the first and second statistics being less than a cumulative category bin count threshold.

In one or more eighteenth embodiments, for any of the seventeenth embodiments classifying the picture further comprises classifying the picture as screen content in response to the sum of the first and second statistics being less the second cumulative count threshold when the first statistic exceeds the first cumulative count threshold, and classifying the picture as non-screen content when the sum of the first and second statistics also exceeds the second cumulative count threshold.

In one or more nineteenth embodiments, for any of the fourteenth embodiments determining the statistics further comprises determining a first statistic indicative of a proportion of the blocks satisfying a minimal variance threshold, and classifying the picture further comprises classifying the picture as non-screen content in response to the first statistic failing to satisfy a first proportion threshold.

In one or more twentieth embodiments, for any of the nineteenth embodiments the minimal variance threshold is equal to zero and the first statistic is the proportion of the blocks having zero variance.

In one or more twenty-first embodiments, for any of the nineteenth embodiments determining the statistics further comprises determining a first statistic indicative of the proportion of the blocks satisfying a minimal variance threshold, and determine a second statistic indicative of the proportion of the blocks satisfying a large variance threshold. Classifying the picture further comprises classifying the picture as screen content in response to the second statistic satisfying a second proportion threshold, and the proportion of blocks satisfying the minimal variance threshold, when summed with the proportion of blocks satisfying the large variance threshold, satisfying a cumulative proportion threshold.

In one or more twenty-second embodiments, for any of the twenty-first embodiments classifying the picture further comprises classifying the picture as screen content in response to the first statistic failing to be less than the first proportion threshold, the second statistic exceeding the second proportion threshold, and the summation of first and second statistics exceeding the cumulative proportion threshold. Classifying the picture as non-screen content in response to the first statistic being less than the first proportion threshold, or the second statistic failing to exceed the second proportion threshold, or the proportion of blocks satisfying the large variance threshold failing to exceed the total proportion threshold.

In one or more twenty-third embodiments, for any of the thirteenth through twenty-second embodiments, the method further comprises selecting transform units (TU) for the picture from a first set of TU sizes including two or more TU sizes when the picture is classified as non-screen content, and from a second set of TU sizes including at least one TU size small than those included in the first set when the picture is classified as screen content.

In one or more twenty-fourth embodiments, one or more machine-readable medium having a plurality of instructions stored thereon which, when executed on a computing device, cause the computing device to perform any one the thirteenth through twenty-third example.

In one or more twenty-fifth embodiments, an apparatus for video encoding comprises one or more processors to perform any one the thirteenth through twenty-third example.

In one or more twenty-sixth embodiments, an apparatus comprises a computerized processing means to determine one or more statistics indicative of pixel value distribution within a picture, a computerized processing means to classify the picture as screen content or non-screen content based on a comparison of the statistics to one or more predetermined thresholds, an adaptive selection means to select coding modes for blocks of the picture from a first set of coding modes including one or more screen content coding modes when the picture is classified as screen content, and from a second set of modes excluding the screen content coding modes when the picture is classified as non-screen content, and a computerized encoding means to generate a bitstream by encoding the blocks of the picture according to their selected coding modes.

In one or more twenty-seventh embodiments, for any of the twenty-sixth embodiments the statistics comprise a frequency of a pixel value within the picture, and the processors are to determine the frequency for each of a plurality of pixel values spanning a range of possible pixel values, or the statistics comprise variance of the pixel value within a block of the picture, and the processors are to determine the variance for each of the blocks within the picture.

In one or more twenty-eighth embodiments, for any of the twenty-sixth or twenty-seventh embodiments the pixel value comprises luma.

In one or more twenty-ninth embodiments, for any of the twenty-sixth or twenty-seventh embodiments the pixel value further comprises chrominance.

In one or more thirtieth embodiments, for any of the twenty-sixth through twenty-ninth embodiments the processing means is to determine a first statistic indicative of the number of the pixel value frequencies that exceed a first frequency threshold, and classify the picture as screen content in response to the first statistic being less than a first category bin count threshold.

In one or more thirty-first embodiments, for any of the thirtieth embodiments the processing means is to determine a second statistic indicative of a number of the pixel value frequencies that fail to exceed the first frequency threshold, but exceed a second frequency threshold smaller than the first frequency threshold, and classify the picture as screen content in response to a sum of the first and second statistics being less than a cumulative category bin count threshold.

In one or more thirty-second embodiments, for any of the thirty-first embodiments the processing means is to classify the picture as screen content in response to the sum of the first and second statistics being less the cumulative category bin count threshold when the first statistic exceeds the first category bin count threshold, and classify the picture as non-screen content when the sum of the first and second statistics also exceeds the cumulative category bin count threshold.

In one or more thirty-third embodiments, for any of the twenty-seventh embodiments the processors are to determine a first statistic indicative of a proportion of the blocks satisfying a minimal variance threshold, and classify the picture as non-screen content in response to the first statistic failing to satisfy a first proportion threshold.

In one or more thirty-fourth embodiments, for any of the thirty-third embodiments the minimal variance threshold is equal to zero and the first statistic is the proportion of be blocks having zero variance.

In one or more thirty-fifth embodiments, one or more non-transitory computer-readable storage medium having a plurality of instructions stored thereon which, when executed on a computing device, cause the computing device to perform a method of video coding, comprising determining one or more statistics indicative of pixel value distribution within a video picture, classifying the picture as screen content or non-screen content based on a comparison of the statistics to one or more predetermined thresholds, selecting coding modes for blocks of the picture from a first set of coding modes including one or more screen content coding modes when the picture is classified as screen content, and from a second set of modes excluding the screen content coding modes when the picture is classified as non-screen content, and generating a bitstream by encoding the blocks of the picture according to their selected coding modes.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include the undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. An apparatus for video encoding, the apparatus comprising one or more processors to:
   determine one or more statistics indicative of pixel value distribution within a picture or portion thereof, wherein the statistics comprise:
      a frequency of a pixel value within the picture or portion thereof, and the processors are to determine the frequency for each of a plurality of pixel values spanning a range of possible pixel values; or
      a variance of the pixel value within a block of the picture or portion thereof, and the processors are to determine the variance for each block within the picture or portion thereof;
   classify the picture or portion thereof as screen content or non-screen content based on a comparison of the statistics to one or more predetermined thresholds;
   select a coding-mode for one or more blocks of the picture or portion thereof from a first set of coding modes including one or more screen content coding modes when the picture or portion thereof is classified as screen content, and from a second set of modes excluding the screen content coding modes when the picture or portion thereof is classified as non-screen content; and
   generate a bitstream by encoding the one or more blocks according to the selected coding mode.

2. The apparatus of claim 1, wherein the pixel value comprises luma.

3. The apparatus of claim 2, wherein the pixel value further comprises chrominance.

4. The apparatus of claim 1, wherein the processors are to:
determine a first statistic indicative of the number of the pixel value frequencies that exceed a first frequency threshold; and
classify the picture or portion thereof as screen content in response to the first statistic being less than a first category bin count threshold.

5. The apparatus of claim 4, wherein the processors are to:
determine a second statistic indicative of a number of the pixel value frequencies that fail to exceed the first frequency threshold, but exceed a second frequency threshold smaller than the first frequency threshold; and
classify the picture or portion thereof as screen content in response to a sum of the first and second statistics being less than a cumulative category bin count threshold.

6. The apparatus of claim 5, wherein the processors are to:
classify the picture or portion thereof as screen content in response to the sum of the first and second statistics being less the cumulative category bin count threshold when the first statistic exceeds the first category bin count threshold; and
classify the picture or portion thereof as non-screen content when the sum of the first and second statistics also exceeds the cumulative category bin count threshold.

7. The apparatus of claim 1, wherein the processors are to:
determine a first statistic indicative of a proportion of the blocks satisfying a minimal variance threshold; and
classify the picture or portion thereof as non-screen content in response to the first statistic failing to satisfy a first proportion threshold.

8. The apparatus of claim 7, wherein the minimal variance threshold is equal to zero and the first statistic is the proportion of the blocks having zero variance.

9. The apparatus of claim 8, wherein the processors are to:
determine a second statistic indicative of a proportion of the blocks satisfying a large variance threshold; and
classify the picture or portion thereof as screen content in response to:
the second statistic satisfying a second proportion threshold; and
the proportion of blocks satisfying the minimal variance threshold, when summed with the proportion of blocks satisfying the large variance threshold, satisfies a cumulative proportion threshold.

10. The apparatus of claim 9, wherein the processors are to:
classify the picture or portion thereof as screen content in response to:
the first statistic failing to be less than the first proportion threshold;
the second statistic exceeding the second proportion threshold; and
the summation of the first and second statistics exceeding the cumulative proportion threshold; and
classify the picture or portion thereof as non-screen content in response to:
the first statistic being less than the first proportion threshold; or
the second statistic failing to exceed the second proportion threshold; or
the proportion of blocks satisfying the large variance threshold failing to exceed the total proportion threshold.

11. The apparatus of claim 1, wherein the processors are to:
select transform units (TU) for the picture or portion thereof from a first set of TU sizes including two or more TU sizes when the picture or portion thereof is classified as non-screen content, and from a second set of TU sizes including at least one TU size smaller than those included in the first set when the picture or portion thereof is classified as screen content.

12. A computer-implemented method for video encoding, the method comprising:
determining one or more statistics indicative of pixel value distribution within a picture or portion thereof, wherein the statistics comprise:
a frequency of a pixel value within the picture or portion thereof, and determining the statistics further comprises determining the frequency for each of a plurality of pixel values spanning a range of possible pixel values; or
a variance of the pixel value within a block of the picture or portion thereof, and determining the statistics further comprises determining the variance for each block within the picture or portion thereof;
classifying the picture or portion thereof as screen content or non-screen content based on a comparison of the statistics to one or more predetermined thresholds;
selecting a coding mode for one or more blocks of the picture from a first set of coding modes including one or more screen content coding modes when the picture or portion thereof is classified as screen content, and from a second set of modes excluding the screen content coding modes when the picture or portion thereof is classified as non-screen content; and
generating a bitstream by encoding the one or more blocks according to the selected coding mode.

13. The method of claim 12, wherein the pixel value comprises luma.

14. The method of claim 12, wherein:
determining the statistics further comprises determining a first statistic indicative of the number of the pixel value frequencies that exceed a first frequency threshold; and
classifying the picture or portion thereof further comprises classifying the picture or portion thereof as screen content in response to the first statistic being less than a first category bin count threshold.

15. The method of claim 14, wherein the processors are to:
determining the statistics further comprises determining a second statistic indicative of a number of the pixel value frequencies that fail to exceed the first frequency threshold, but exceed a second frequency threshold smaller than the first frequency threshold; and
classifying the picture or portion thereof further comprises classifying the picture or portion thereof as screen content in response to a sum of the first and second statistics being less than a cumulative category bin count threshold.

16. The method of claim 15, wherein classifying the picture or portion thereof further comprises:
classifying the picture or portion thereof as screen content in response to the sum of the first and second statistics being less the second cumulative count threshold when the first statistic exceeds the first cumulative count threshold; and classifying the picture or portion thereof as non-screen content when the sum of the first and second statistics also exceeds the second cumulative count threshold.

17. The method of claim 12, wherein:
determining the statistics further comprises determining a first statistic indicative of a proportion of the blocks satisfying a minimal variance threshold; and
classifying the picture or portion thereof further comprises classifying the picture or portion thereof as non-screen content in response to the first statistic failing to satisfy a first proportion threshold.

18. The method of claim 17, wherein the minimal variance threshold is equal to zero and the first statistic is the proportion of the blocks having zero variance.

19. The method of claim 17, wherein:
determining the statistics further comprises:
determining
a second statistic indicative of a proportion of the blocks satisfying a large variance threshold; and
classifying the picture or portion thereof further comprises classifying the picture or portion thereof as screen content in response to:
the second statistic satisfying a second proportion threshold; and
the proportion of blocks satisfying the minimal variance threshold, when summed with the proportion of blocks satisfying the large variance threshold, satisfies a cumulative proportion threshold.

20. The method of claim 19, wherein classifying the picture or portion thereof further comprises:
classifying the picture or portion thereof as screen content in response to:
the first statistic failing to be less than the first proportion threshold;
the second statistic exceeding the second proportion threshold; and
the summation of first and second statistics exceeding the cumulative proportion threshold; and
classifying the picture or portion thereof as non-screen content in response to:
the first statistic being less than the first proportion threshold; or
the second statistic failing to exceed the second proportion threshold; or
the proportion of blocks satisfying the large variance threshold failing to exceed the total proportion threshold.

21. The method of claim 12, further comprising:
selecting transform units (TU) for the picture or portion thereof from a first set of TU sizes including two or more TU sizes when the picture or portion thereof is classified as non-screen content, and from a second set of TU sizes including at least one TU size small than those included in the first set when the picture or portion thereof is classified as screen content.

22. One or more non-transitory computer-readable storage medium having a plurality of instructions stored thereon which, when executed on a computing device, cause the computing device to perform a method of video coding, comprising:
determining one or more statistics indicative of pixel value distribution within a video picture or portion thereof, wherein the statistics comprise:
a frequency of a pixel value within the picture or portion thereof, and the computing device is to determine the frequency for each of a plurality of pixel values spanning a range of possible pixel values; or
a variance of the pixel value within a block of the picture or portion thereof, and the computing device is to determine the variance for each of the blocks within the picture or portion thereof;
classifying the picture or portion thereof as screen content or non-screen content based on a comparison of the statistics to one or more predetermined thresholds;
selecting a coding mode for one or more blocks of the picture or portion thereof from a first set of coding modes including one or more screen content coding modes when the picture or portion thereof is classified as screen content, and from a second set of modes excluding the screen content coding modes when the picture or portion thereof is classified as non-screen content; and
generating a bitstream by encoding the one or more blocks according to the selected coding mode.

* * * * *